US012750861B2

(12) United States Patent
Zhao

(10) Patent No.: US 12,750,861 B2
(45) Date of Patent: Sep. 29, 2026

(54) METHOD AND APPARATUS FOR INDICATING PHYSICAL DOWNLINK SHARED CHANNEL MONITORING, AND MEDIUM

(71) Applicant: SPREADTRUM COMMUNICATIONS (SHANGHAI) CO., LTD., Shanghai (CN)

(72) Inventor: Sicong Zhao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 267 days.

(21) Appl. No.: 18/269,441

(22) PCT Filed: Nov. 29, 2021

(86) PCT No.: PCT/CN2021/133838

§ 371 (c)(1),
(2) Date: Jun. 23, 2023

(87) PCT Pub. No.: WO2022/135059

PCT Pub. Date: Jun. 30, 2022

(65) Prior Publication Data

US 2024/0137946 A1 Apr. 25, 2024
US 2024/0237019 A9 Jul. 11, 2024

(30) Foreign Application Priority Data

Dec. 25, 2020 (CN) ......................... 202011566669.9

(51) Int. Cl.
*H04W 72/232* (2023.01)

(52) U.S. Cl.
CPC ................................ *H04W 72/232* (2023.01)

(58) Field of Classification Search
CPC ............ H04L 5/0053; H04W 52/0229; H04W 52/0216; H04W 72/232; H04W 52/024
See application file for complete search history.

(56) References Cited

U.S. PATENT DOCUMENTS

2019/0327760 A1 10/2019 Holfeld et al.
2020/0280995 A1 9/2020 Ma et al.
(Continued)

FOREIGN PATENT DOCUMENTS

CN 109802755 A 5/2019
CN 110677911 A 1/2020
(Continued)

OTHER PUBLICATIONS

EPO Extended European Search Report for corresponding EP Application No. 21909058.6; Issued Jun. 5, 2024; 12 pages.
(Continued)

*Primary Examiner* — Andrew Lee
(74) *Attorney, Agent, or Firm* — CANTOR COLBURN LLP

(57) ABSTRACT

A method and apparatus for indicating Physical Downlink Control Channel (PDCCH) monitoring, and a medium are provided. The method includes: receiving Downlink Control Information (DCI), wherein the DCI includes at least one indication field which indicates at least one of following: PDCCH search space switching and PDCCH monitoring skipping; and performing a corresponding operation on PDCCH monitoring based on the at least one indication field in the DCI.

3 Claims, 1 Drawing Sheet

(56) References Cited

U.S. PATENT DOCUMENTS

| | | | | |
|---|---|---|---|---|
| 2020/0314811 | A1 | 10/2020 | Lin et al. | |
| 2021/0227572 | A1 | 7/2021 | Miao et al. | |
| 2022/0022070 | A1 | 1/2022 | Wu et al. | |
| 2022/0150946 | A1* | 5/2022 | Tsai | H04W 76/28 |
| 2022/0240187 | A1* | 7/2022 | Guo | H04W 76/30 |
| 2022/0369418 | A1 | 11/2022 | Ma et al. | |
| 2023/0048959 | A1* | 2/2023 | Hu | H04L 1/1883 |
| 2023/0309108 | A1* | 9/2023 | Maleki | H04L 5/0053 |
| 2023/0362952 | A1* | 11/2023 | He | H04B 7/06952 |
| 2023/0362954 | A1* | 11/2023 | Moon | H04W 72/0446 |
| 2024/0023130 | A1* | 1/2024 | Schober | H04W 52/0229 |
| 2024/0406867 | A1* | 12/2024 | Wu | H04W 76/27 |

FOREIGN PATENT DOCUMENTS

| | | | |
|---|---|---|---|
| CN | 111262672 | A | 6/2020 |
| CN | 111278096 | A | 6/2020 |
| EP | 3498005 | A1 | 6/2019 |
| EP | 4082294 | A1 | 11/2022 |
| WO | 2018058485 | A1 | 4/2018 |
| WO | 2020246858 | A1 | 4/2018 |

OTHER PUBLICATIONS

Ericsson "UE power saving using search space set switching"; 3GPP TSG RAN WG1 #101-e; Tdoc R1-2004360; e-Meeting, May 25 to Jun. 5, 2020; 6 pages.

Qualcomm Incorporated "PDCCH-based power saving channel design"; 3GPP TSG-RAN WG1 #97; R1-1907294; Reno, USA, May 13-17, 2019; 16 pages.

SIPO 1st Office Action for corresponding CN Application No. 2011566669.9; Issued Mar. 14, 2024; 12 pages.

International Search Report for International Application No. PCT/CN2021/133838; Date of Mailing, Mar. 4, 2022.

VIVO, "Discussion on DCI-based power saving adaptation in connected mode"; 3GPP TSG RAN WG1#103-e; R1-2007676; Oct. 26-Nov. 1'3, 2020; 13 pages.

Indian Hearing Notice for IN Corresponding Application 202317049678; Issued Jul. 17, 2026.

Physical Layer Procedures for Control, 3GPP TS 38.213 version 16.2.0 Release 16. ETSI TS 138 213. vol 16.2.0 (2020).

* cited by examiner

METHOD AND APPARATUS FOR INDICATING PHYSICAL DOWNLINK SHARED CHANNEL MONITORING, AND MEDIUM

CROSS-REFERENCE TO RELATED APPLICATIONS

This is the U.S. national stage of application No. PCT/CN2021/133838, filed on Nov. 29, 2021. Priority under 35 U.S.C. § 119(a) and 35 U.S.C. § 365(b) is claimed from Chinese Application No. 202011566669.9 filed Dec. 25, 2020, the disclosure of which is also incorporated herein by reference.

TECHNICAL FIELD

The present disclosure generally relates to radio communication technology field, and more particularly, to a method and apparatus for indicating physical downlink shared channel monitoring, and a readable storage medium.

BACKGROUND

Battery life of a User Equipment (UE) is essential to user experience, which affects experience of using 5G devices and/or services. Consequently, 5G systems have introduced some technologies to indicate changes in UE behavior, to make the UE enter a power-saving state under appropriate conditions to save power. This state switching involves changes in various configurations, including switching of Bandwidth Part (BWP) (switching to a smaller BWP), switching of Physical Downlink Control Channel (PDCCH) detection cycle (switching to a larger cycle), skipping part of PDCCH monitoring (PDCCH monitoring skipping) and cross-slot scheduling with a minimum scheduling interval greater than 0, etc. Signaling that triggers these configuration changes is carried by Downlink Control Information (DCI), which is supported by most companies.

In standard technology research of 5G NR Release 16, a part of energy-saving technology based on cross-slot scheduling has been completed. In the upcoming research of Release 17, technology for reducing monitoring of PDCCH will be one of key technologies to be discussed. Existing methods for reducing PDCCH monitoring mainly include switching of PDCCH monitoring cycle (such as search space set switching) and skipping PDCCH monitoring (PDCCH skipping).

PDCCH search space switching may be triggered by specific DCI, and PDCCH skipping may also be indicated by specific DCI. Both of the above two methods for reducing PDCCH monitoring may include multiple states, that is, multiple DCI bits are required to indicate multiple states.

SUMMARY

Embodiments of the present disclosure may reduce DCI downlink overhead when implementing PDCCH monitoring cycle switching and PDCCH skipping.

In an embodiment of the present disclosure, a method for indicating PDCCH monitoring is provided, including receiving DCI, wherein the DCI includes at least one indication field which indicates at least one of following: PDCCH search space switching and PDCCH monitoring skipping; and performing a corresponding operation on PDCCH monitoring based on the at least one indication field in the DCI.

Optionally, the DCI includes two indication fields, wherein a first indication field indicates PDCCH search space switching, and a second indication field indicates PDCCH monitoring skipping.

Optionally, the DCI includes a third indication field which indicates at least one of following: PDCCH search space switching and PDCCH monitoring skipping.

Optionally, the third indication field includes at least two bits, one of values corresponding to the at least two bits represents a non-operation state, and the PDCCH search space switching and the PDCCH monitoring skipping are not performed based on that a value of the third indication field represents the non-operation state.

Optionally, the third indication field indicates the PDCCH search space switching.

Optionally, the third indication field indicates the PDCCH monitoring skipping.

Optionally, the third indication field has length of 1 bit, and indicates the PDCCH search space switching and the PDCCH monitoring skipping and said receiving the DCI further includes: acquiring a bit value of a target field from the DCI, wherein the bit value of the target field indicates whether to trigger indication of the third indication field.

Optionally, the third indication field has length of 1 bit, and indicates the PDCCH search space switching and the PDCCH monitoring skipping, and prior to said performing a corresponding operation on PDCCH monitoring, the method further includes: receiving a control instruction which carries a target field, wherein a value of the target field indicates whether to trigger indication of the third indication field; and acquiring the target field from the control instruction.

Optionally, the target field is a field of a cross-slot scheduling mechanism.

In an embodiment of the present disclosure, an apparatus for indicating PDCCH monitoring is provided and includes a memory and a processor, wherein the memory has computer instructions stored therein, and when the processor executes the computer instructions, any one of the above methods is performed.

In an embodiment of the present disclosure, a non-volatile or non-transitory computer readable storage medium having computer instructions stored therein is provided, wherein when the computer instructions are executed, any one of the above methods is performed.

DETAILED DESCRIPTION

As described in the background, in exiting techniques, PDCCH search space switching may be triggered by specific DCI, and PDCCH skipping may also be indicated by specific DCI. Both of the above two methods for reducing PDCCH monitoring may include multiple states, that is, multiple DCI bits are required to indicate multiple states, resulting in relatively large downlink overhead.

In the embodiments of the present disclosure, an indication field in the DCI is capable to indicate at least one of PDCCH search space switching and PDCCH monitoring skipping, so as to reduce DCI downlink overhead during PDCCH search space switching and PDCCH monitoring skipping.

In order to clarify the objects, characteristics and advantages of the disclosure, embodiments of present disclosure will be described in detail in conjunction with accompanying drawings.

Figure 1:
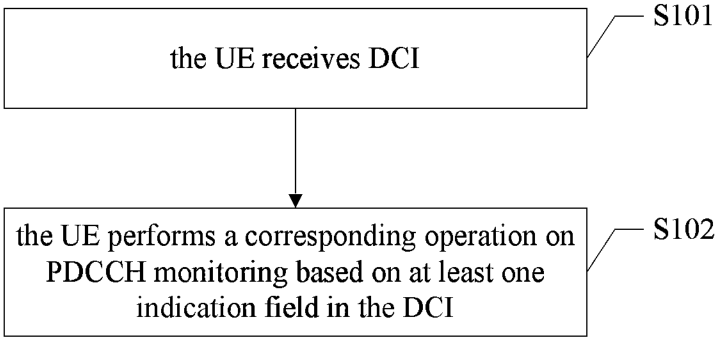
FIG. 1 is a flow chart of a method for indicating PDCCH monitoring according to an embodiment.

In an embodiment, a method for indicating PDCCH monitoring is provided. Referring to FIG. 1, details of the method are provided via specific steps below.

In some embodiments, the method including S101 and S102 may be performed by a baseband chip in a UE.

In S101, the UE receives DCI.

In S102, the UE performs a corresponding operation on PDCCH monitoring based on at least one indication field in the DCI.

In some embodiments, the DCI may be transmitted by a base station, and includes at least one indication field which indicates at least one of following: PDCCH search space switching and PDCCH monitoring skipping.

In the embodiment of the present disclosure the control information transmitted by the base station may include a first indication field and a second indication field which are independent from each other and indicate PDCCH search space switching and PDCCH monitoring skipping, respectively.

For example, the first indication field indicates PDCCH search space switching, and the second indication field indicates PDCCH monitoring skipping; or the first indication field indicates PDCCH monitoring skipping, and the second indication field indicates PDCCH search space switching.

In the embodiments of the present disclosure, a search space is PDCCH monitoring configuration information, including a cycle, a duration and an offset of PDCCH monitoring. The search space switching includes switching between search spaces, switching between sets of search spaces, or switching between set groups of search spaces.

In the embodiments of the present disclosure, a number of bits in the first indication field and a number of bits in the second indication field may be set respectively. If the first indication field indicates PDCCH search space switching, and length of the first indication field is X bits, a value of the first indication field may indicate $2^X$ PDCCH monitoring cycles. If the first indication field indicates PDCCH monitoring skipping, and length of the first indication field is X bits, the value of the first indication field may indicate a number of slots corresponding to $2^X$ PDCCH skipping.

In some embodiments, the first indication field and the second indication field may be both DCI fields, or one of them is a DCI field, and the other is another field.

In some embodiments, the DCI transmitted by the base station may include merely a third indication field which indicates whether to perform at least one of the PDCCH search space switching and the PDCCH monitoring skipping. Length of the third indication field may be 1 bit, or 2 bits or more.

In the embodiments of the present disclosure, the third indication field includes at least two bits, and different bit values of the third indication field indicate at least one of the PDCCH search space switching and the PDCCH monitoring skipping. One of values of the at least two bits represents a non-operation state. When the value of the third indication field represents a non-operation state, neither the PDCCH search space switching nor the PDCCH monitoring skipping is performed.

For example, the third indication field includes two bits. When the value of the two bits of the third indication field is 00, it represents a non-operation state. Upon detecting that the value of the third indication field is 00, the UE determines that there is no need to perform PDCCH search space switching and PDCCH monitoring skipping.

In the embodiments of the present disclosure, other values of the two bits of the third indication field can be used to represent PDCCH search space switching, or represent PDCCH monitoring skipping, or partially represent PDCCH search space switching and partially represent PDCCH monitoring skipping.

For example, when the value of the two bits of the third indication field is 00, it represents a non-operation state; when the value of the two bits of the third indication field is 01, it represents PDCCH search space switching, and a search space set group switches to search space set group 1; when the value of the two bits of the third indication field is 10, it represents PDCCH search space switching, and the search space set group switches to search space set group 2; and when the two bits of the third indication field is 11, it represents PDCCH skipping 4 slots.

As another example, when the value of the two bits of the third indication field is 00, it represents a non-operation state; when the value of the two bits of the third indication field is 01, it represents PDCCH skipping 2 slots; when the value of the two bits of the third indication field is 10, it represents PDCCH skipping 4 slots; and when the value of the two bits of the third indication field is 11, it represents PDCCH search space switching.

In the existing techniques, if it needs to indicate three states of PDCCH monitoring skipping (for example, skipping lengths are 0, 2, and 4 respectively), 2 bits are required for indication. Further, if the PDCCH search space switching corresponds to two states (SS set 0 and SS sett), 1 bit is required for indication. In the above application scenario, if PDCCH search space switching and PDCCH monitoring skipping are indicated simultaneously, at least 3 bits are required.

It can be seen from the above embodiments of the present disclosure that in the third indication field, one (00) of the values corresponding to the two bits represents the non-operation state, so that two bits can indicate the three states of PDCCH monitoring skipping (for example, skipping lengths are 0, 2, and 4 respectively) and the PDCCH search space switching corresponds to two states (SS set 0 and SS sett). Compared with the need for 3 bits in the existing techniques, technical solutions provided in the embodiments of the present disclosure may reduce a number of bits of DCI and downlink overhead.

In the embodiments of the present disclosure, the third indication field may include merely 1 bit, and the value of this bit indicates whether to perform PDCCH search space switching or to perform PDCCH monitoring skipping.

In some embodiments, the base station may configure whether the third indication field indicates the PDCCH search space switching or the PDCCH monitoring skipping through high-layer signaling. The high-layer signaling may be Radio Resource Control (RRC) signaling or other types of high-layer signaling.

In the embodiments of the present disclosure, if the base station configures the third indication field to indicate PDCCH search space switching, when the value of the third indication field is 1, it indicates that the PDCCH search space switching needs to be performed; and when the value of the third indication field is 0, it indicates that the PDCCH search space switching does not need to be performed. If the base station configures the third indication field to indicate PDCCH monitoring skipping, when the value of the third indication field is 1, it indicates that the PDCCH monitoring skipping needs to be performed; and when the value of the third indication field is 0, it indicates that the PDCCH monitoring skipping does not need to be performed.

Alternatively, if the base station configures the third indication field to indicate the PDCCH search space switching, when the value of the third indication field is 1, it may indicate that it is unnecessary to perform the PDCCH search space switching; and when the value of the third indication field is 0, it indicates that the PDCCH search space switching needs to be performed. If the base station configures the third indication field to indicate the PDCCH monitoring skipping, when the value of the third indication field is 1, it may indicate that the PDCCH monitoring skipping does not need to be performed; and when the value of the third indication field is 0, it indicates that the PDCCH monitoring skipping needs to be performed.

In some embodiments, when the third indication field merely includes 1 bit, it may be determined whether the third indication field indicates the PDCCH search space switching or the PDCCH monitoring skipping based on different values of the third indication field. That is, when the third indication field merely includes 1 bit, the value of the one bit can indicate the PDCCH search space switching or the PDCCH monitoring skipping.

In the embodiments of the present disclosure, when the third indication field merely includes 1 bit, the value of the 1 bit may be set to be a first value indicating to perform the PDCCH search space switching, or to be a second value indicating to perform the PDCCH monitoring skipping. It should be noted that the first value is not equal to the second value.

For example, when the third indication field merely includes 1 bit, when the value of this bit is 0, it indicates to perform the PDCCH search space switching; and when the value of this bit is 1, it indicates to perform the PDCCH monitoring skipping.

In some embodiments, whether to trigger the third indication field may be determined by a value of a preset target field, that is, it is determined by the value of the target field that 1 bit in the third indication field indicates the PDCCH search space switching or the PDCCH monitoring skipping.

In some embodiments, the preset target field may be a field of a cross-slot scheduling mechanism. Whether to trigger the corresponding indication is determined by the value of the field of the cross-slot scheduling mechanism. The field of the cross-slot scheduling mechanism may be a field corresponding to a minimum scheduling offset or other field.

For example, the value of 1 bit corresponding to the third indication field is 0 which indicates that the PDCCH monitoring skipping is performed. When the bit corresponding to the minimum scheduling offset is 1, the UE does not monitor PDCCH during a period between receiving scheduled DCI and scheduled PDSCH; and when the bit corresponding to the minimum scheduling offset is 0, the PDCCH monitoring skipping is invalid, and the UE monitors PDCCH between receiving the scheduled DCI and the scheduled PDSCH.

The value of 1 bit corresponding to the third indication field is 1 which indicates to perform the PDCCH search space switching. When the value of the bit corresponding to the minimum scheduling offset is 1, the PDCCH search space switches to a PDCCH monitoring cycle configured by a high-layer signaling; and when the value of the bit corresponding to the minimum scheduling offset is 0, the PDCCH search space switching is not performed.

In some embodiments, the target field may be carried by the DCI transmitted by the base station or may be carried by a control instruction transmitted by the base station.

In some embodiments, if at least one indication field in the DCI indicates PDCCH search space switching, the UE performs the corresponding operation on PDCCH monitoring includes performing the PDCCH search space switching. Accordingly, if at least one indication field in the DCI indicates PDCCH monitoring skipping, the UE performs the corresponding operation on PDCCH monitoring includes skipping a corresponding number of slots, and not performing PDCCH monitoring on the skipped slots.

From above, in the embodiments of the present disclosure, the third indication field merely includes one bit indicating PDCCH search space switching and PDCCH monitoring skipping, and the target field is used to indicate whether to trigger the third indication field. Therefore, the one bit can be used to indicate PDCCH search space switching and PDCCH monitoring skipping, which reduces DCI downlink overhead.

In some embodiments, S101 to S102 are performed by the UE. Accordingly, a method for indicating PDCCH monitoring may be performed by a base station.

In some embodiments, the base station may transmit to the UE DCI which includes at least one indication field. After receiving the DCI, the UE may acquire the at least one indication field therein and perform a corresponding operation on PDCCH monitoring. The at least one indication field indicates at least one of following: PDCCH search space switching and PDCCH monitoring skipping.

In some embodiments, specific processes of the method for indicating PDCCH monitoring performed by the base station can be referred to S101 and S102 and are not described in detail here. In the embodiments of the present disclosure, steps of the method for indicating PDCCH monitoring performed by the base station may be executed by a control chip in a base station device, or by other chips capable of implementing control functions in the base station device.

Figure 2:
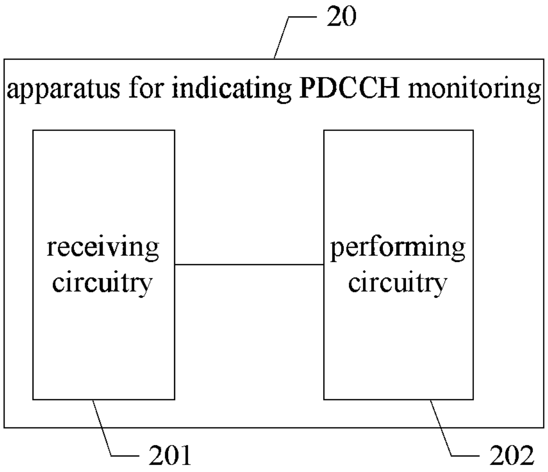
FIG. 2 is a structural diagram of an apparatus for indicating PDCCH monitoring according to an embodiment.

FIG. 2 is a structural diagram of an apparatus 20 for indicating PDCCH monitoring according to an embodiment. The apparatus 20 includes a receiving circuitry 201 and a performing circuitry 202.

The receiving circuitry 201 is configured to receive DCI, wherein the DCI includes at least one indication field which indicates at least one of following: PDCCH search space switching and PDCCH monitoring skipping.

The performing circuitry 202 is configured to perform a corresponding operation on PDCCH monitoring based on the at least one indication field in the DCI.

In some embodiments, more details of the receiving circuitry 201 and the performing circuitry 202 may be referred to the above descriptions of S101 and S102, and are not repeated here.

In some embodiments, the apparatus 20 may correspond to a chip (such as a baseband chip) with a data processing function in a UE, or to a chip module containing a chip with a data processing function in a UE, or to a UE.

An embodiment of the present disclosure further provides an apparatus for indicating PDCCH monitoring, including: a transmitting circuitry configured to transmit to a UE DCI which includes at least one indication field, to make the UE perform a corresponding operation on PDCCH monitoring based on the at least one indication field, wherein the at least one indication field indicates at least one of following: PDCCH search space switching and PDCCH monitoring skipping.

In some embodiments, the above apparatus may correspond to a chip with a data processing function in a base station, or to a chip module containing a chip with a data processing function in a base station, or to a base station.

In some embodiments, modules/units included in each apparatus and product described in the above embodiments may be software modules/units, hardware modules/units, or a combination of software modules/units and hardware modules/units.

For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a non-volatile or non-transitory computer-readable storage medium having computer instructions stored therein is provided, wherein when the computer instructions are executed by a processor, any one of the above methods is performed.

In an embodiment of the present disclosure, an apparatus for indicating PDCCH monitoring which includes a memory and a processor is provided, wherein the memory has computer instructions stored therein, and when the processor executes the computer instructions, the above method including S101 to S103 is performed.

In an embodiment of the present disclosure, an apparatus for indicating PDCCH monitoring which includes a memory and a processor is provided, wherein the memory has computer instructions stored therein, and when the processor executes the computer instructions, the above method performed by the base station is performed.

Those skilled in the art could understand that all or part of steps in the various methods in the above embodiments can be completed by instructing relevant hardware through a program, and the program can be stored in any computer-readable storage medium which includes a ROM, a RAM, a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for indicating Physical Downlink Control Channel (PDCCH) monitoring, comprising:

receiving Downlink Control Information (DCI), wherein the DCI comprises an indication field comprising two bits; and performing a corresponding operation on PDCCH monitoring based on the indication field in the DCI;

wherein some values of the two bits represent PDCCH search space switching and other values of the two bits represent PDCCH monitoring skipping, which comprises:

in response to the two bits being a first value, it representing PDCCH search space switching, and a search space set group switching to search space set group 1;

in response to the two bits being a second value, it representing PDCCH search space switching, and the search space set group switching to search space set group 2;

in response to the two bits being a third value, it representing PDCCH skipping a first number of slots; or in response to the two bits being a fourth value, it representing PDCCH skipping a second number of slots.

2. A non-volatile or non-transitory computer readable storage medium storing one or more programs, the one or more programs comprising computer instructions, which, when executed by a processor, cause the processor to:

receive Downlink Control Information (DCI), wherein the DCI comprises an indication field comprising two bits; and perform a corresponding operation on PDCCH monitoring based on the indication field in the DCI;

wherein some values of the two bits represent PDCCH search space switching and other values of the two bits represent PDCCH monitoring skipping, which comprises:

in response to the two bits being a first value, it representing PDCCH search space switching, and a search space set group switching to search space set group 1;

in response to the two bits being a second value, it representing PDCCH search space switching, and the search space set group switching to search space set group 2;

in response to the two bits being a third value, it representing PDCCH skipping a first number of slots; or in response to the two bits being a fourth value, it representing PDCCH skipping a second number of slots.

3. An apparatus for indicating Physical Downlink Control Channel (PDCCH) monitoring, comprising a memory and a processor, wherein the memory stores one or more programs, the one or more programs comprising computer instructions, which, when executed by the processor, cause the processor to:

receive Downlink Control Information (DCI), wherein the DCI comprises an indication field comprising two bits; and perform a corresponding operation on PDCCH monitoring based on the indication field in the DCI;

wherein some values of the two bits partially represent PDCCH search space switching and other values of the two bits represent PDCCH monitoring skipping, which comprises:

in response to the two bits being a first value, it representing PDCCH search space switching, and a search space set group switching to search space set group 1;

in response to the two bits being a second value, it representing PDCCH search space switching, and the search space set group switching to search space set group 2;

in response to the two bits being a third value, it representing PDCCH skipping a first number of slots; or in response to the two bits being a fourth value, it representing PDCCH skipping a second number of slots.

* * * * *